United States Patent [19]

Singer, Jr.

[11] 4,449,156

[45] May 15, 1984

[54] TELEPHONE CENTRAL OFFICE GAS TUBE REPLACEMENT PROTECTOR

[75] Inventor: Loren A. Singer, Jr., Mamaroneck, N.Y.

[73] Assignee: Porta Systems Corp., Syosset, N.Y.

[21] Appl. No.: 422,828

[22] Filed: Sep. 24, 1982

[51] Int. Cl.³ .............................................. H02H 7/20

[52] U.S. Cl. .................................... 361/119; 361/120; 361/124

[58] Field of Search ....................... 361/119, 120, 124; 337/17, 18, 31, 32

[56] References Cited

U.S. PATENT DOCUMENTS

| | | | |
|---|---|---|---|
| 886,374 | 5/1908 | Kaisling | 337/32 |
| 1,726,807 | 9/1929 | Cook | 361/124 X |
| 2,724,793 | 11/1955 | Fisher | 361/124 |
| 3,254,181 | 5/1966 | Lemieux | 361/124 X |
| 4,062,053 | 12/1977 | Cwirzen | 361/124 X |
| 4,086,648 | 4/1978 | Hines et al. | 361/124 |
| 4,249,224 | 2/1981 | Baumbach | 361/124 |

*Primary Examiner*—Harry E. Moose, Jr.

*Attorney, Agent, or Firm*—Charles E. Temko

[57] ABSTRACT

A replacement gas tube protector module for central office installation having older types of protector blocks in which the original carbon block assembly is resiliently clamped between a pair of spring fingers. The module is configured such that the resilient force exerted by the spring fingers serve to short a gas tube replacing the original carbon block in the event of failure of the gas tube component.

1 Claim, 5 Drawing Figures

TELEPHONE CENTRAL OFFICE GAS TUBE REPLACEMENT PROTECTOR

BACKGROUND OF THE INVENTION

This invention relates generally to the field of telephony, and more particularly to an improved protector module intended for use as a replacement in conjunction with older type protector blocks.

In recent years, owing to substantial improvement in the quality and availability of small gas filled tubes, practically all new installations are provided with gas tube type protection. For the most part, such modules are encased within a housing having connecting pins or contacts at one end thereof for engagement with corresponding terminals on a newer type protector block, there being a single such module for each subscriber pair.

There are, however, a great number of telephone offices still in operation which use protector blocks or an earlier design originally equipped with carbon block type protectors. Typical of such installations are the Western Electric Type C-50, the 3800 series, and Type 675 and 676 blocks, which are characterized in the provision of individual spring fingers, pairs of which resiliently grip the carbon block assembly which is slidably engaged between adjacent fingers. The carbon blocks provide an air gap performing the same function as a gas tube, but with the disadvantages inherent with this type of protection, such as the deterioriation of the surfaces of the blocks forming the air gap. Replacement modules for this type installation are already known in the art, and normally comprise all of the elements of the known gas tube modules, including not only the gas tube itself, and a meltable solder pellet, but a resilient element which becomes operative upon the melting of a solder pellet which causes a shorting of the gas tube should it fail during a sustained excess current surge. No attempt has been made to simplify the construction of such modules by utilizing the resilient force available in the spring fingers which retain the module in installed position.

SUMMARY OF THE INVENTION

Briefly stated, the invention contemplates the provision of an improved protector module of the class described in which the component parts thereof have been substantially simplified as compared with existing devices, with accompanying ease of manufacture and assembly at a correspondingly reduced manufacturing cost. The disclosed embodiment incorporates a meltable solder pellet or washer bearing directly upon a first contact which is in turn positioned beneath one of the spring fingers of the protector block, so that upon the melting of the solder pellet or washer, the spring finger, in cooperation with an opposed spring finger provides the necessary resilient force to move the first contact into communication with a second contact, already in contact with the second finger to provide an effective short relative to the gas tube.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
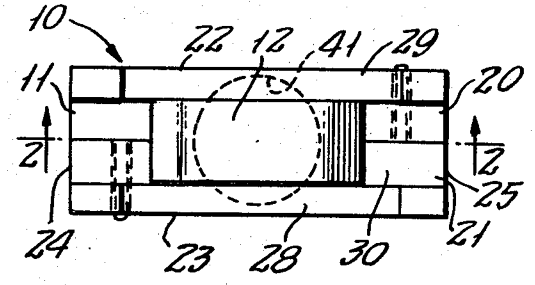
FIG. 1 is a top plan view of an embodiment of the invention.
Figure 3:
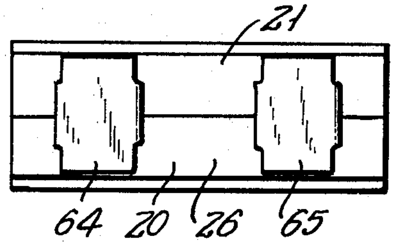
FIG. 3 is a bottom plan view thereof.

In accordance with the invention, the device, generally indicated by reference character 10, comprises broadly: a housing element 11, a first contact element 12, a second contact element 13, a solder washer 14, and a gas tube element 15.

The housing element 15, is preferably formed as first and second symmetrical members 20 and 21, injection molded from insulative synthetic resinous material. The members are substantially identical, and in assembled condition are bordered by first and second side surfaces 22 and 23, first and second end surfaces 24 and 25, a lower surface 26, an upper surface 27, and upstanding walls 28 and 29 forming with the surface 27 a channel 30 for the reception of a first spring finger 31 normally present on the protector block. A second spring finger 32 resiliently underlies the lower surface 26. Extending outwardly from inner wall surfaces 33 are first, second, and third projections 34, 35, and 36, respectively, forming four channels 37, 38, 39, and 40. An arcuately shaped recess 41 accommodates the elements 14 and 15, as will more fully appear. Each of the members 21 and 22 is provided with a transverse bore 42 and a corresponding pin 43 to facilitate assembly.

The first contact element 12 is preferably formed as a metallic stamping, and includes a central portion 50 and a pair of hook-like portions 51 and 52 which are disposed within the channels 37 and 38, respectively. Angularly disposed portions 54 serve as cam surfaces to facilitate engagement with the first spring finger 31.

The second contact element 13 is also preferably a metallic stamping, and includes a central portion 61, a pair of laterally extending portions 62 and 63, a pair of longitudinally disposed contact portions 64 and 65, at least one of which contacts the second spring finger 32 when in engaged condition. A pair of terminal portions 66 and 67 form camming surfaces for engagement with the second spring finger 32.

The solder washer 14 is of conventional construction, and is formed from a eutectic alloy which melts at a suitable temperature. It is bounded by a peripheral surface 70, a first end surface 71 which underlies the central portion 50, and a second end surface 72 which abuts the gas tube element 15. The gas tube element is of known two-terminal type, and includes a first end surface 81 contacting the washer 14 and a second end surface 82 which contacts the central portion 61 of the second contact element 13. It will be observed from a consideration of FIG. 2 that while the solder washer is in position, the first and second contact elements 12 and 13 are maintained in mutually spaced relation.

Figure 4:
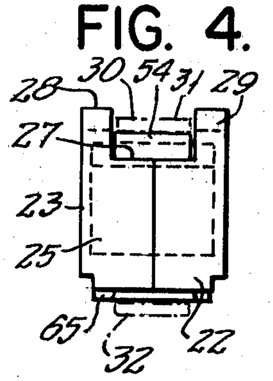
FIG. 4 is an end elevational view as seen from the right hand portion of FIG. 2.
Figure 2:
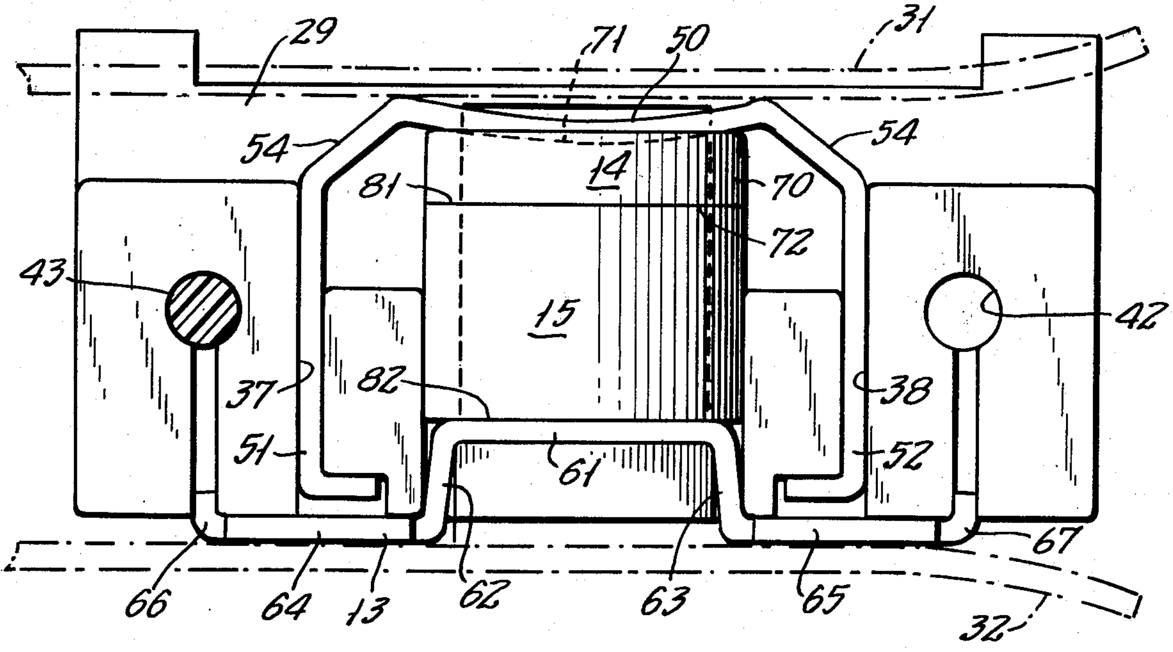
FIG. 2 is a longitudinal central sectional view thereof as seen from the plane 2—2 in FIG. 1.
Figure 5:
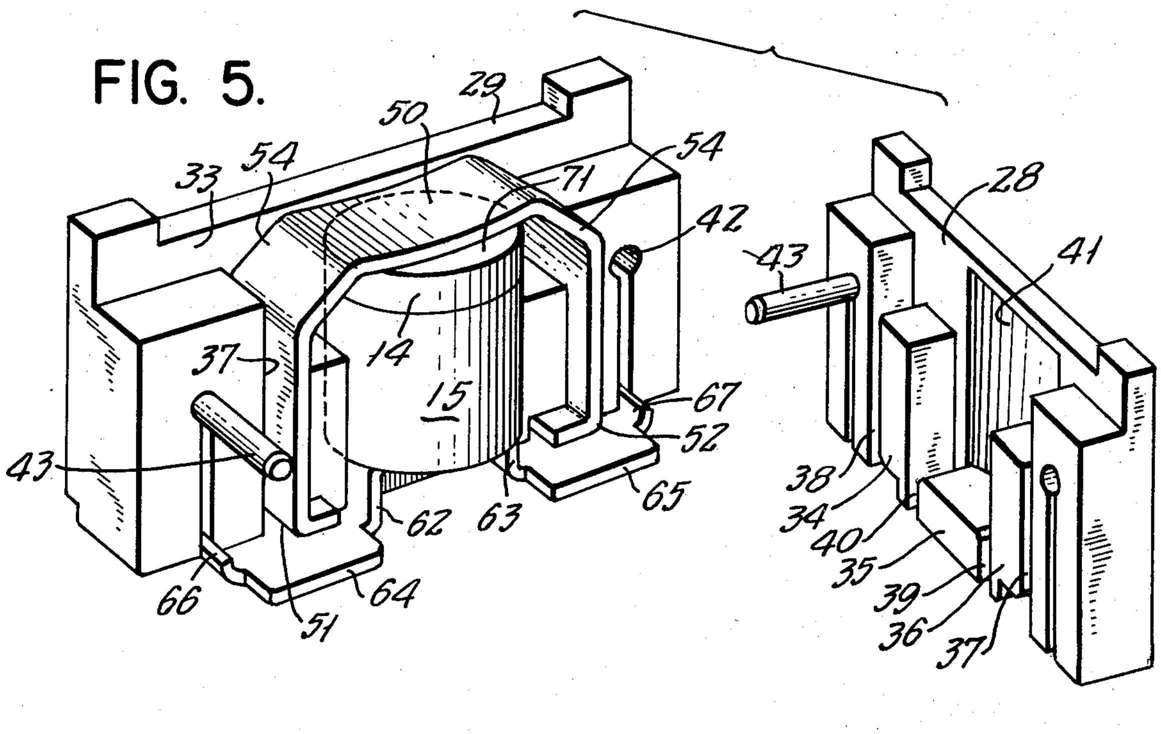
FIG. 5 is an isometric, disassembled view of an embodiment of the invention.

Operation of the module will be apparent from a consideration of FIGS. 2 and 4 in the drawing. The device 10 is inserted between the spring fingers 31 and 32 to replace an existing protector assembly (not shown). Upon the occurrence of a sustained excess current surge sufficient to melt the washer 14, the compressive force existing between the spring fingers 31 and 32 will move the first contact element downwardly as seen in FIG. 2 until the ends of the hook-like portions 51 and 52 contact the inner surface of the contact portions 64 and 65 to bypass the gas tube element 15, and permit the surge to flow directly through the contact portions 64 and 65 to the second spring finger 32 and subsequently to ground. By utilizing this compressive force, the need for a separate resilient element disposed within the module is eliminated.

I wish it to be understood that I do not consider the invention limited to the precise details of structure shown and set forth in this specification, for obvious modifications will occur to those skilled in the art to which the invention pertains.

I claim:

1. In an improved telephone protector module of a type having a channeled housing adapted to be engaged between a pair of resilient spring fingers on a protector block, the improvement comprising: a first contact element positioned within said housing and having an exposed surface thereon projecting externally of said housing to selectively contact one of said pair of spring fingers; a second contact element, positioned within said housing and having a second exposed surface thereon projecting externally in an opposite direction from said housing to simultaneously contact the other of said pair of spring fingers; a gas tube element, and a meltable solder washer disposed within said housing in aligned mutually contacting relation, one end surface of said pellet underlying said exposed surface of said first contact element, and one end of said gas tube element contacting said second contact element; said solder washer maintaining said first and second contacts in mutually spaced relation; whereby upon the engagement of said module between said first and second spring fingers, and the melting of said solder washer, the resultant force between said spring fingers serves to urge portions of said first and second contact elements into mutual contact to establish a path of conductivity bypassing said gas tube element.

* * * * *